March 19, 1940.  H. ALLEN  2,194,259
HIGH PRESSURE MULTIPLE PLATE PACKING
Filed Dec. 27, 1937   5 Sheets-Sheet 1
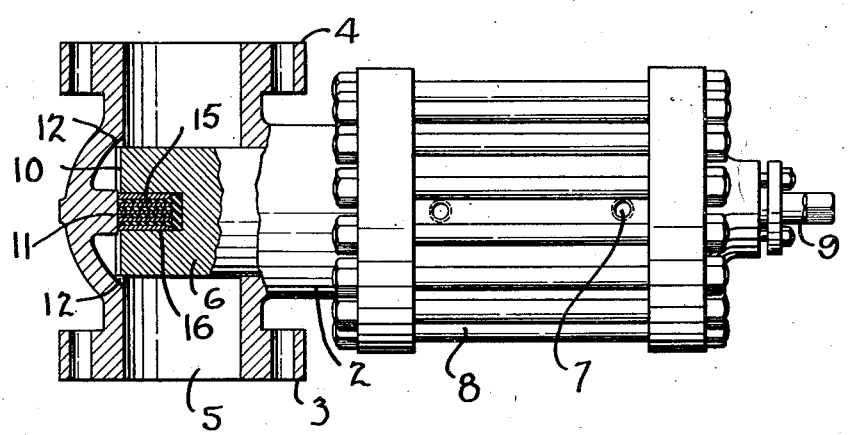
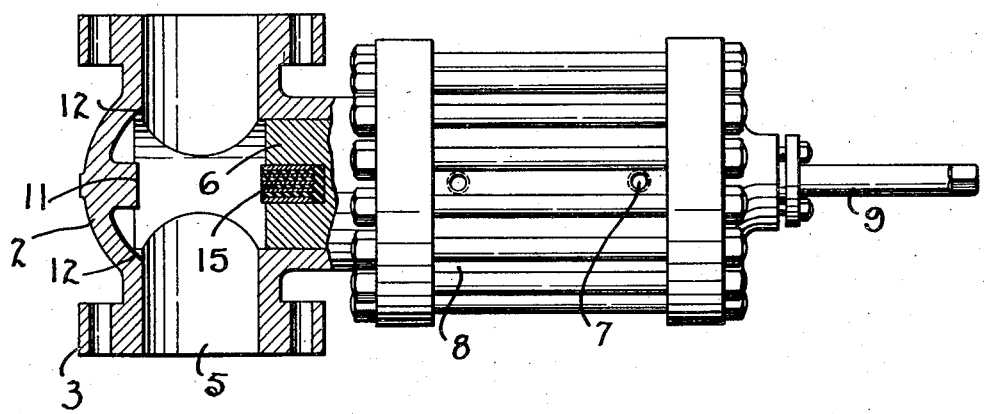
HERBERT ALLEN
INVENTOR
BY Jesse R. Stone
Lester B. Clark
ATTORNEYS

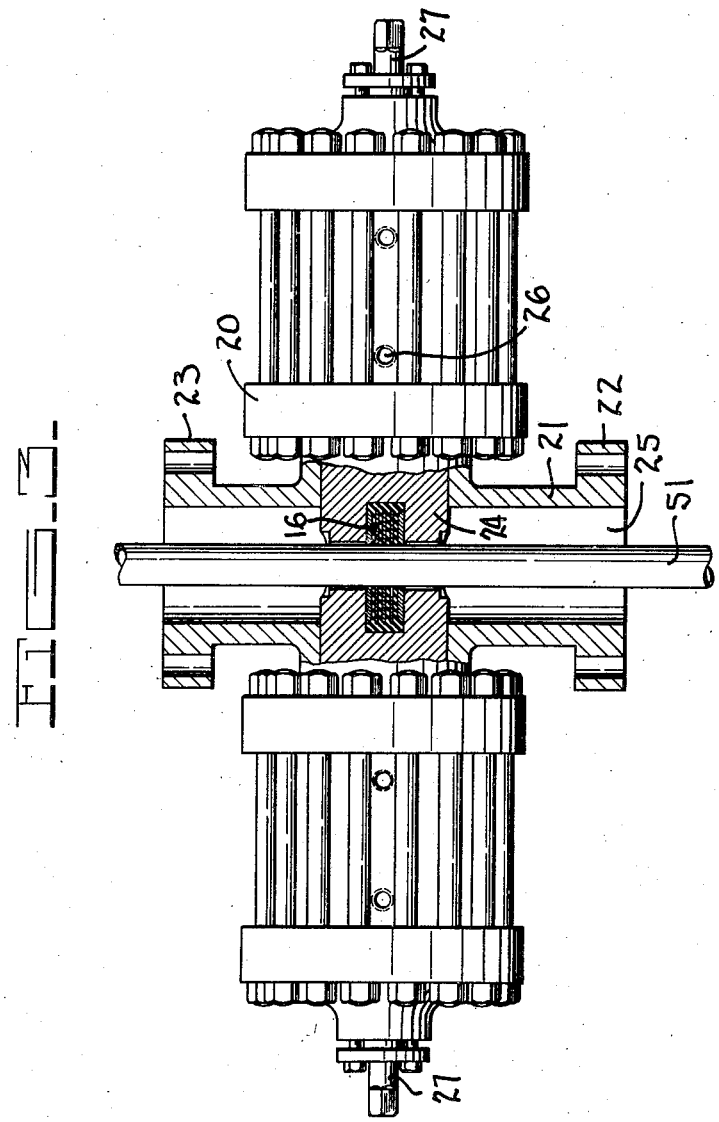

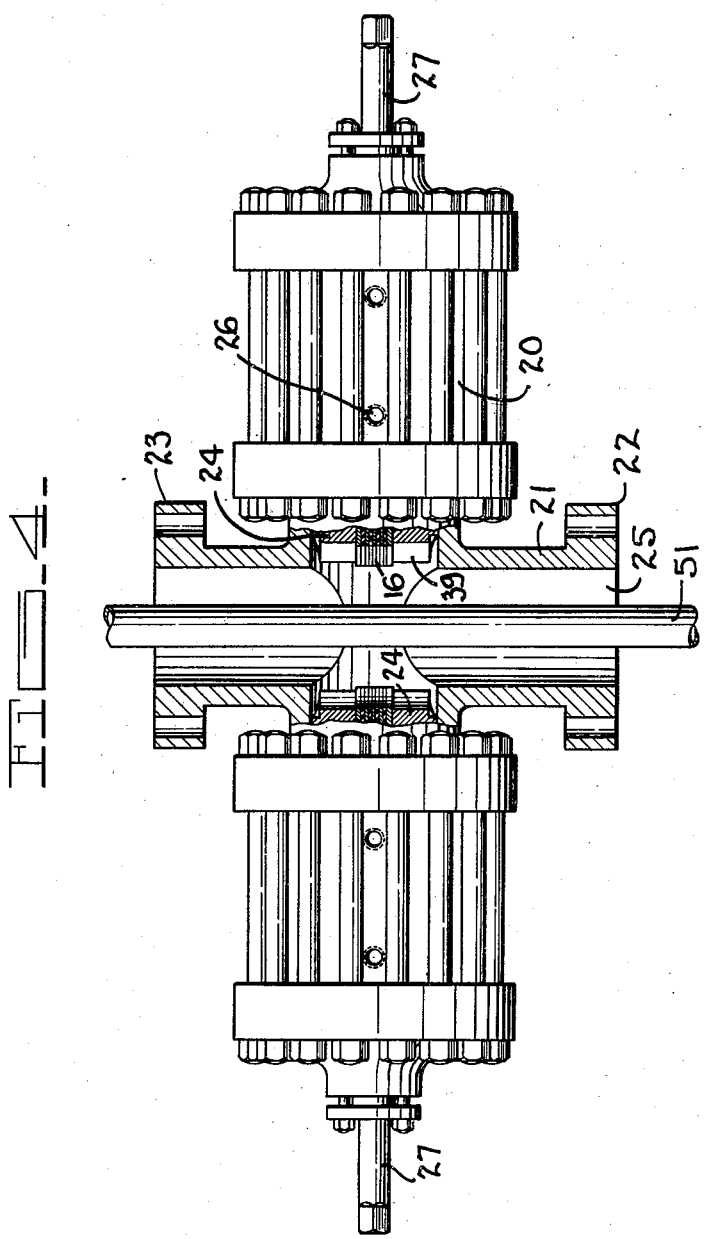

March 19, 1940.   H. ALLEN   2,194,259
HIGH PRESSURE MULTIPLE PLATE PACKING
Filed Dec. 27, 1937   5 Sheets-Sheet 4
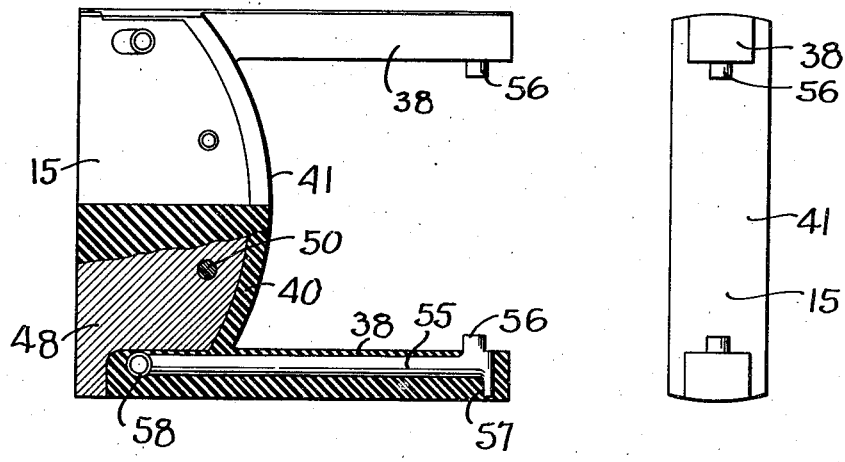
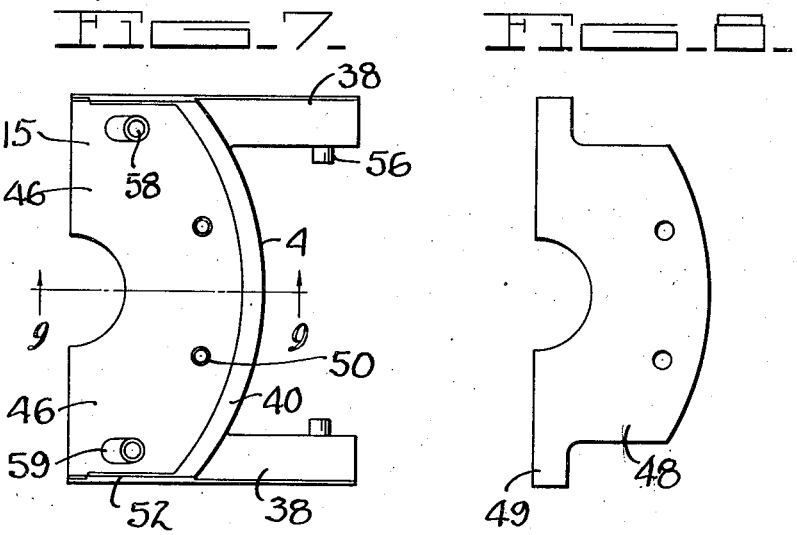
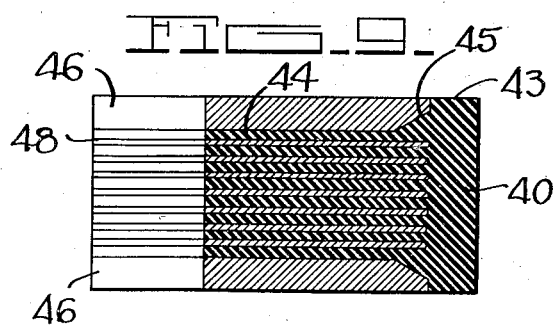
HERBERT ALLEN
INVENTOR
BY Jesse R. Stone
Lester B Clark
ATTORNEYS.

March 19, 1940.   H. ALLEN   2,194,259
HIGH PRESSURE MULTIPLE PLATE PACKING
Filed Dec. 27, 1937   5 Sheets-Sheet 5
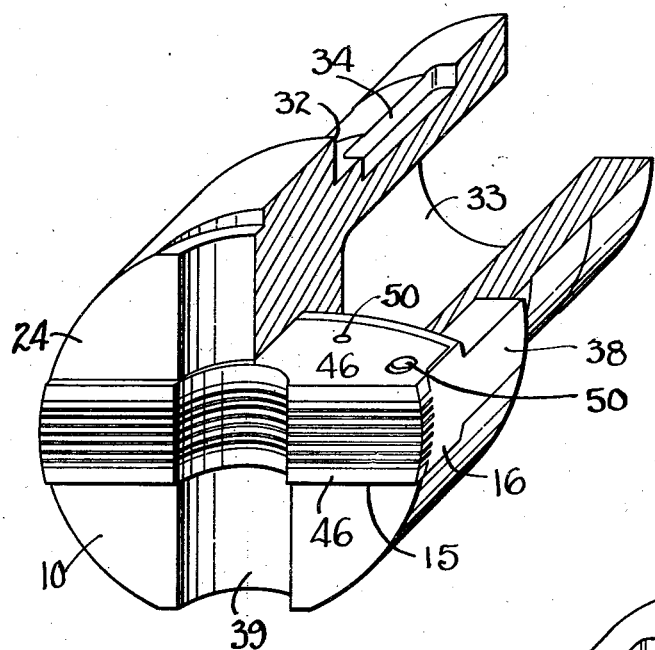
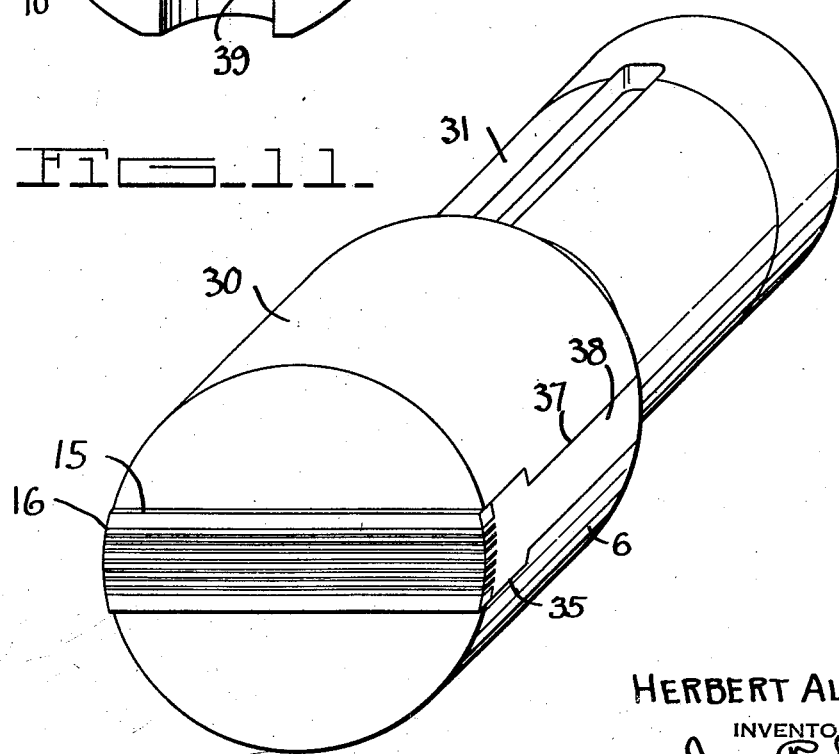
HERBERT ALLEN
INVENTOR
BY Jesse R. Stone
Lester B. Clark
ATTORNEYS Patented Mar. 19, 1940

2,194,259

UNITED STATES PATENT OFFICE 2,194,259

HIGH PRESSURE MULTIPLE PLATE PACKING

Herbert Allen, Houston, Tex., assignor to Cameron Iron Works, a corporation

Application December 27, 1937, Serial No. 181,833

10 Claims. (Cl. 251—159)

The invention relates to a particular type of packing to be used with valves and blowout preventers where high pressures are to be sealed off.

In the drilling of wells by the rotary method the well bore is open for the escape of pressures encountered in the earth formations except for the weight of the column of drilling fluid in the well, which tends to overcome the formation pressure. Various types of drilling fluid or mud have been provided wherein heaviers are introduced in the mud to increase its specific gravity and create a greater pressure on the formation to overcome blowouts. In view of such operations and the fact that the deeper wells as a general rule encounter greater pressures, when a pressure is encountered which is sufficient to overcome the weight of the column of drilling fluid then a very serious blowout occurs and an enormous pressure must be confined. With these features in mind the present invention directs itself to a packing for blowout preventers and valves which is adapted to form a complete seal across the well bore in such a manner that very high pressures can be confined.

It is one of the objects of the invention to provide in combination with a blowout preventer or valve housing a ram arranged to carry a packing which will be confined by the housing and the ram along with a plurality of reenforcing plates which are embedded in the packing.

Another object of the invention is to provide a high pressure multiple plate packing for blowout preventers and valves.

Another object of the invention is to provide a resilient packing body which is confined by top and bottom plates and reenforced intermediate such plates.

Another object of the invention is to provide a packing assembly which comprises an arrangement of the resilient material and reenforcing plates floating therein.

Still another object of the invention is to provide a packing assembly having reenforcing and retaining portions therein to hold it in position in a supporting ram or valve member.

Still another object of the invention is to provide a packing assembly which is reenforced with retainer plates to resist transverse stresses.

Other and further objects of the invention will be readily apparent when the following description is considered in connection with the accompanying drawings wherein Fig. 1 is a side elevation of a valve showing the ram in closed position and certain of the parts in section.

Fig. 2 is a view similar to Fig. 1 showing the ram or valve member in open position.

Fig. 3 shows a side elevation of the blowout preventer illustrating the rams in closed position.

Fig. 4 is a similar view to Fig. 3 and showing the rams in open position.

Fig. 5 is a top plan view of the packing assembly for a valve with the plates and the packing material broken away and shown in section to illustrate the arrangement thereof.

Fig. 6 is an end elevation looking to the left at Fig. 5.

Fig. 7 is a top plan view of a packing assembly for a blowout preventer.

Fig. 8 is a top plan view of one of the intermediate retainer or reenforcing plates.

Fig. 9 is a section taken on the line 9—9 of Fig. 7.

Fig. 10 shows a perspective view of one of the blowout preventer ram members with certain parts shown in section to illustrate the assembly of the parts.

Fig. 11 is a perspective view of a ram or valve member showing a float forward face.

Fig. 1 shows a valve generally known as a drilling valve which embodies a valve housing 2, which is attached to the well head or casing by means of a flange 3. Other equipment may be attached to the top of the valve by means of the flange 4. This valve has a central passage 5 therethrough which is arranged to be closed by the ram or valve member 6, which member is in turn operated either by fluid pressure applied to the openings 7 on the cylinder 8 or by means of the spindle 9. This general type of valve is disclosed in the application for patent of J. S. Abercrombie and Herbert Allen, Serial No. 62,267, filed February 4, 1936, now Patent 2,162,990, granted June 20, 1939. The forward face 10 of the ram or valve member is arranged to abut against an outstanding seat 11 in order to form a seal across the passage 5. To prevent cutting of the seat and damage to the packing assembly a choke portion 12 is provided above and below the seat 11, as is more fully described in the above mentioned co-pending application.

The ram 6 is provided with a recess 15 which receives the packing assembly 16. As seen in Fig. 1, the valve member has been moved to closed position so that the packing is in close engagement with the seat 11 to provide a seal. In Fig. 2 the valve member is in open position.

Figs. 3 and 4 show the application of the packing construction to a blowout preventer 20, which includes the housing 21, the lower flange 22, and the upper flange 23. The ram members 24 are movable transversely of the passage 25 when fluid pressure is introduced in the openings 26, or the rams may be moved by means of the spindle 27. The particular construction of such a blowout preventer is disclosed more fully in the co-pending application of Herbert Allen, Serial No. 242,123, filed November 23, 1938.

Fig. 11 shows a perspective view of one of the rams which has been removed from the housing and this ram includes a body portion 30 and the shank 31. While a cylindrical ram has been shown it is to be understood that it may take any desired configuration. The shank and the ram are separated by the shoulder portion 32 and the ram is hollowed out at 33 to provide space for the spindle by which it is operated.

A groove 34 is arranged to receive a pin projecting from the inside of the housing to retain the ram against relative rotation.

The forward portion of the ram is provided with a slot or recess 15 which receives the packing assembly 16. This recess extends in the form of a groove 37 along each side of the ram and receives the leg portion 38 of the packing. Fig. 10 shows the type of a ram with a semi-circular opening 39 therein to fit about a pipe in the well bore and the opposing ram is formed with a similar recess so that the two rams together form a complete closure about the pipe.

The ram of the type shown in Fig. 11 may be used either with the valve of Figs. 1 and 2 or with the blowout preventer of Figs. 3 and 4, the only difference being in the length of the ram construction because naturally with the valve of Fig. 1 a longer ram is required to extend completely across the passage than is required with the blowout preventer of Fig. 4 where the two rams cooperate together. This ram of Fig. 11 has a flat front face to be used in the valve and is also capable of use in the blowout preventer when there is no pipe extending through the passage. It is to be understood, however, that the packing construction hereinafter described may be applied to either type of ram and that it can be used either with the flush face or with the recessed face to fit about the pipe, as circumstances may require.

Figs. 5 to 9, inclusive, show the details of construction of the packing assembly 15. This assembly is made up of a body of resilient material 40, which has a curved rear face 41 and the legs 38 projecting rearwardly at each edge thereof. In Fig. 10 the legs 38 are relatively short whereas in Fig. 11 they are longer to correspond with the length of the ram.

This resilient body 40 is best seen in section in Fig. 9 wherein it is provided with a thickened area 43, which merges with a tongue portion 44 by means of the inclined face 45. Reenforcing or retainer plates 46 are spaced on the top and the bottom of this tongue 44 in order to confine the resilient material when it is subjected to a transverse stress due to the pressure in the passage of the valve or blowout preventer.

Where enormous pressures are encountered it is impossible to provide any substantial body or volume of rubber or other resilient material through which the pressure can be distributed without reenforcing it by a more or less rigid structure and to provide for such reenforcement in the present packing a plurality of thin retainer plates 48 have been molded or otherwise disposed within the tongue 44 of the packing assembly. As seen in Fig. 9, a plurality of these plates may be provided spaced at the desired distance in accordance with the pressures which it is contemplated the packing will be called upon to resist. These plates preferably extend rearwardly into the packing approximately the same distance as the top and bottom plates 46. One of these retainer plates 48 is seen in Fig. 8 and it will be observed that it is provided with ears 49 at each side so that it will extend completely across the front face while the remaining portion of the plate is reduced in width so that it will be disposed within the body of packing material. Any desired number of these plates 48 may be provided.

The assembly of the parts is the same in Figs. 5 and 7 except for the length of the legs 38. If desired a plurality of openings 50 may be provided in the various plates so that the resilient material will project thereinto and in this manner the plates are held in assembly with the packing material.

When a seal is to be effected the ram is moved forwardly until the metal plates either engage the pipe such as 51 in Figs. 3 and 4, or the seat 11 in Figs. 1 and 2. In either event when the metal plates have contacted the object about which the seal is to be made, then they are restrained from further movement, but where the ram member is moved thereafter due to pressure thereon tending to close the ram, it seems clear that pressure will be exerted on the rear face 41 of the resilient packing material and the packing material will be urged forwardly between the top and bottom plates 46 so as to compensate for any wearing away of the packing material on the front face and to apply a uniform pressure throughout the packing material. The plates 48 tend to prevent any excessive flowing of the resilient material either upward or downward and in this manner while the pressure can be uniformly distributed through the resilient material the material is still confined and limited in its movement tending to flow upwardly or downwardly beyond the plates 46.

As seen in Fig. 7 the top plates are cut away at 52 so as to allow the resilient material to overlie the edges of the plate and in this manner prevent scoring of the cylinder or housing and to insure a seal at the edge of the ram.

In order to retain the entire packing assembly 15 in position in the ram retainer rods 55 may be embedded in the resilient materials of the legs. These rods as seen in Fig. 5 have an inwardly projecting dowel 56 which is arranged to fit within a complementary recess in the base of the groove 37, and also having a projection 57 thereon to confine the extreme end of the resilient material. This rod 55 projects forwardly to a location near the front face of the packing and is provided with a transverse head 58 which is of a length to pass into the slot 59 in the top and bottom plates 46. This slot 59 is elongated so as to allow for movement of the legs relative to the plate in compensating for wear and the application of pressure.

Broadly the invention contemplates the provision of a resilient packing which is confined by top and bottom plates and reenforced intermediate by retainer plates.

What is claimed is:

1. A ram and packing assembly for valves and preventers comprising a ram, a recess therein, grooves along the sides of said ram, a packing fitted into said recess and grooves, and reenforcing rods in each leg and arranged to hook into said ram.

2. A ram and packing assembly for valves and preventers comprising a ram, a recess therein, grooves along the sides of said ram, a packing fitted into said recess and grooves, and reenforcing rods in each leg and arranged to hook into said ram, the forward end of said rod extending into the packing in said recess.

3. A ram and packing assembly for valves and preventers comprising a ram, a recess therein, grooves along the sides of said ram, a packing fitted into said recess and grooves, reenforcing rods in each leg and arranged to hook into said ram, and reenforcing plates above and below said packing.

4. A ram and packing assembly for valves and preventers comprising a ram, a recess therein, grooves along the sides of said ram, a packing fitted into said recess and grooves, reenforcing rods in each leg and arranged to hook into said ram, and reenforcing plates above and below said packing, said plates extending into said recess to bear against said ram to confine said packing.

5. A ram and packing assembly for valves and preventers comprising a ram, a recess therein, grooves along the sides of said ram, a packing fitted into said recess and grooves, reenforcing rods in each leg and arranged to hook into said ram, reenforcing plates above and below said packing, and retainer plates in the packing intermediate said first plate.

6. A packing assembly comprising a body of resilient material, reenforcing plates above and below said body, said body being thickened behind said plates so that as the plates abut an object the material may be forced around the rear ends of the plates to maintain a seal, and retainer plates embedded in said material between said first plates to uniformly distribute the flowing of the material under pressure.

7. A packing assembly comprising a body of resilient material, rigid retainer plates transversely of said body, leg portions on said body, and a retainer rod in each leg.

8. A packing assembly comprising a body of resilient material, rigid retainer plates transversely of said body, leg portions on said body, and a retainer rod in each leg, said rods projecting through said plates.

9. A packing assembly comprising a body of resilient material, rigid retainer plates transversely of said body, leg portions on said body, a retainer rod in each leg, and top and bottom plates to confine said packing, said rods projecting through said top and bottom plates.

10. In a device adapted to abut an object to seal an opening against pressure, a packing carried by the device, means on the packing disposed to abut and confine the packing, means to force the device toward the object to compress the packing and establish a pressure in the confined packing of a value greater than that in the opening to be closed, and a plurality of retainer plates embedded in the packing between said first means to prevent undue distortion thereof.

HERBERT ALLEN.